Figure 1:
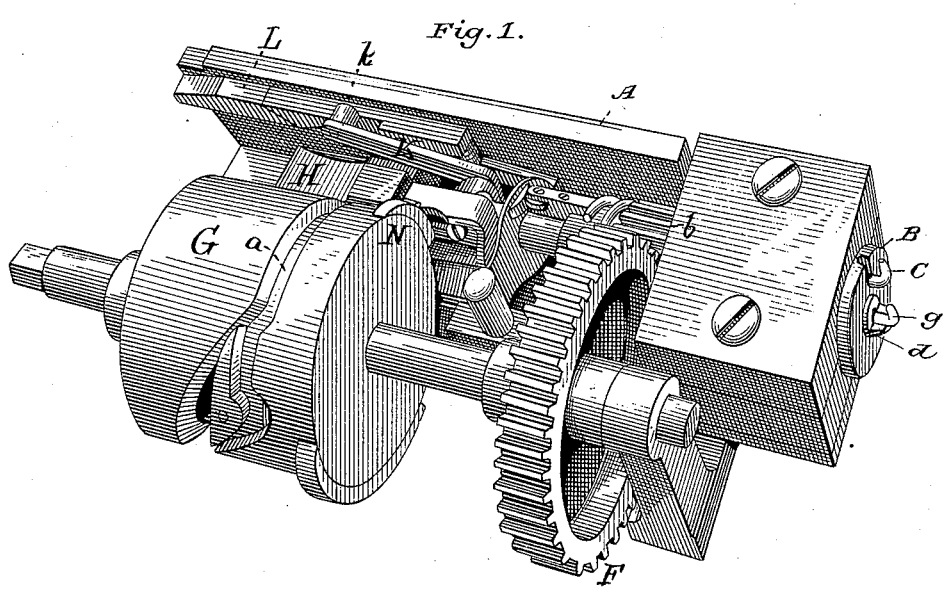

(Model.)

2 Sheets—Sheet 1.

J. H. DEAN.
CORD TYER FOR GRAIN BINDERS.

No. 255,944. Patented Apr. 4, 1882.

Attest:
R. F. Barnes.
A. B. Smith

Inventor:
J. H. Dean (Model.) 2 Sheets—Sheet 2.
J. H. DEAN.
CORD TYER FOR GRAIN BINDERS.
No. 255,944. Patented Apr. 4, 1882.
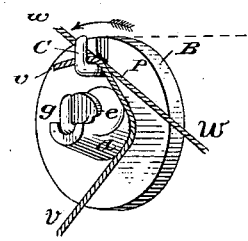
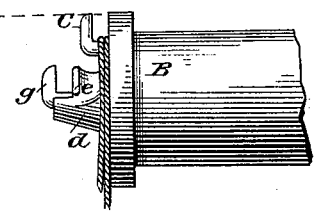
Fig. 2.
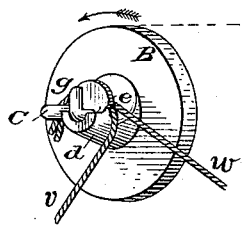
Fig. 3.
Fig. 4.
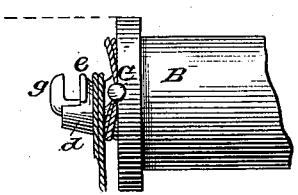
Fig. 5.
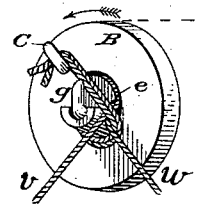
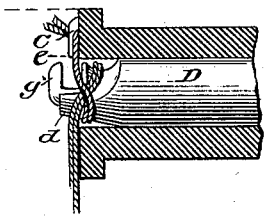
Fig. 6.
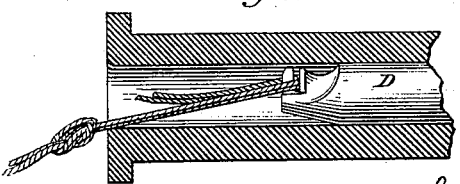
Fig. 7.
Attest:
R. F. Barnes.
A. B. Smith.
Inventor:
J. H. Dean
R. D. Smith
N. PETERS. Photo-Lithographer. Washington. D. C.

UNITED STATES PATENT OFFICE.

J. HENRY DEAN, OF KALAMAZOO, MICHIGAN, ASSIGNOR TO WHITELEY, FASSLER & KELLY, OF SPRINGFIELD, OHIO.

CORD-TYER FOR GRAIN-BINDERS.

SPECIFICATION forming part of Letters Patent No. 255,944, dated April 4, 1882.

Application filed April 5, 1880. (Model.)

*To all whom it may concern:*

Be it known that I, J. HENRY DEAN, of Kalamazoo, in the county of Kalamazoo and State of Michigan, have invented a new and useful Apparatus for Knotting Cords, applicable to Grain-Binders, &c.; and I do hereby declare that the following is a full and complete description of the same, reference being had to the accompanying drawings, wherein—

Figure 1 is a perspective view of my device for knotting the band and mechanism capable of actuating the same detached from the machine, whereby the material to be bound is gathered into a bundle and the band placed around the same. Figs. 2, 3, 4, 5, 6, and 7 represent in perspective and elevation the knotter in its various positions while tying the knot.

Heretofore, so far as I am aware, the cord has not been positively held and controlled during every part of the operation of forming the knot, and the knot has been discharged from the tyer before it has been drawn up tight, the expansion of the bundle being depended on to tighten the knot.

The object of my device is the reverse of this. It is designed to hold and control the cord positively during the whole process of forming the knot, and to act positively to draw the same tight after the loop has been discharged off the tyer.

The characteristic features of my invention are a rotating griper to hold the ends of the band and carry them around a looping-neck, a laterally-projecting detent-lip, and a central hook or griper to seize and draw the ends through the loop to form the knot.

I have stated that my knot-tyer is applicable to grain-binders, and it is for such use that I contemplate using it, chiefly; but it is also applicable to other purposes and capable of use with machines different from grain-binders in structure and mode of operation. For this reason the devices for collecting material to be bound and for placing the band around the same are not shown. They are well understood and do not require description. In this patent I propose to restrict myself to the method or mechanism which is immediately concerned in the formation of the knot, without including any of the devices whereby the same may be actuated. However, for the purpose of completeness, I show in Fig. 1 a series of devices capable of properly actuating the knotter, but do not propose to limit myself in any way to the actuating devices as shown. In another specification executed and filed of even date herewith I have particularly described and specially claimed those devices.

That others may fully understand my invention, I will particularly describe it.

A is the supporting-frame, which is attached in some proper manner to the supporting-frame of the machine, which carries and presents the cord.

A rotating hollow cylinder, B, is placed in suitable bearings at the end of the frame A, and serves as a carrier for the griper-hook C, by which the ends of the cord to be knotted together are seized, held, and carried around the knotter D, which reciprocates within said cylinder, but does not rotate with it.

Having now described the mechanical offices of the devices, I will recapitulate by describing the formation of the knot.

In Figs. 2, 3, 4, 5, 6, 7 the various successive movements of the knotter during the process of tying the knot are shown. Fig. 2 represents the knotter in its initial position, as hereinbefore described. The band-cord P is laid in the hook C. The part $v$ is the old end, and is held by the outside holder and cutter. The part $w$ extends to the eye of the cord-carrier, and thence back to the source of supply, and the sheaf or gavel to be bound is inclosed in the loop of the cord. The first forward movement of the cylinder B, in connection with the movement of the cam N and intermediate devices described in my said other specification, causes the hook C to close upon the parts $v$ $w$ and firmly hold them, and at a proper moment thereafter the cutter is brought into action and the part $w$ is severed. The outside holder at the same moment seizes the new end and holds it, while the band-carrier recedes and draws from the source of supply material for a new band. The second position, Fig. 3, represents the band as having been severed and entirely held by the hook C. The parts *v w* are now laid across the neck *d* behind the lip or flange *e*. Fig. 4 shows a third position when the hook C has carried the ends of the band beneath the parts *v w*. A stud connected to the rear end of the knotter has now reached a point of the cam-groove *a* where it encounters a small inward projection, which causes the slide H to recede and draw the knotter back into its cell so as to conceal the flange *e*. The ends of the band are therefore caused to swing across in front of said flange *e* as the hook C advances, and the ends of the band are therefore laid directly into the jaw of the looping-hook *g*, which is opened through the medium of the track L and the bell-crank K, as described in my said other specification. Immediately succeeding this the knotter is thrust forward by the passage of the stud into another recess in the cam-groove *a*, and the hook *g* thereupon is caused to close upon the band ends through the medium of a spring, as described in my said other specification, and the hook C is opened to release them.

The movement of the hook *g* in closing and the immediately-succeeding rapid retreat of the knotter have the effect of shedding the loop off the neck *d* while the ends are rapidly drawn backward, and the knot is thereby drawn tight independent of the weight or expansion of the bundle. The retreat of the knotter is also sufficiently distant to draw the ends through the loop, and thereby tie a hard single knot much less likely to become loose or untied than a bow-knot. The holder C will at first draw the cord across the neck *d*, and to that extent it will tighten the band around the gavel. It will continue to so draw the cord over the neck until the frictional resistance on the neck becomes greater than the frictional resistance under the holding-hook C, and thereafter the surplus cord will be drawn backward under said hook, thus utilizing the portion of cord between said holder C and the cutter. The holder C thereby also becomes the measure of the band-tension, and its pressure is graduated so as never to exceed the strength of the band material.

Any suitable device for holding and cutting the band may be employed and any proper cord-carrier may be used. These parts are not specifically described, because this invention relates only to the method of tying the knot which secures together the end of the band.

The knotter D does not revolve, and the cord P is therefore always presented in the same position. It is therefore possible to cut the knotter away on the back, and thus allow the loop to be discharged with greater ease and certainty.

The cord is held and controlled positively during every part of the operation of tying the knot, and there is therefore no possibility of failure by reason of slipping of the cord or failure to remain in proper position at any time.

The operative parts herein described may be at any desirable distance from the knotter, as is evident, because it would be simply a question of length of the cylinder B and operating-shafts. Thus the knotter may be in the plane of the middle of the sheaf and the operating-gear F and cam-wheel G quite outside the machine at its end.

Having described my invention, what I claim as new is—

1. A device for tying knots, consisting of a rotating holder to seize and hold the ends of the band when the same has been severed from the band material and carry the same around a central neck having a lip or flange on one side, mechanism which causes said neck to retreat within a cell so as to confine the cord on one side, a central holding-hook, and mechanism by which said hook is caused to seize and hold the ends while the loop which forms the knot is cast off over said held portion, whereby the cord which forms the knot is held and controlled positively during each step of the process of tying the knot.

2. The looper D, provided with a neck to receive the turns of the cord, and a laterally-projecting lip or flange, *e*, on one side, forming a detent to hold the cord on the neck, combined with an axially-reciprocating hook, whereby the outer part is held in position and carried across the end of said neck into the looping hook or jaw, whereby the ends are then seized and held while the loops are being cast off to form the knot.

J. HENRY DEAN.

Witnesses:
JAMES M. DAVIS,
R. F. JUDSON.